US012691877B2

(12) United States Patent
Hwang

(10) Patent No.: US 12,691,877 B2
(45) Date of Patent: Jul. 28, 2026

(54) VEHICLE CONTROL DEVICE AND METHOD

(71) Applicant: HL Klemove Corp., Incheon (KR)

(72) Inventor: Hae Jin Hwang, Incheon (KR)

(73) Assignee: HL Klemove Corp., Incheon (KR)

( * ) Notice: Subject to any disclaimer, the term of this patent is extended or adjusted under 35 U.S.C. 154(b) by 45 days.

(21) Appl. No.: 18/800,799

(22) Filed: Aug. 12, 2024

(65) Prior Publication Data

US 2025/0313199 A1 Oct. 9, 2025

(30) Foreign Application Priority Data

Apr. 4, 2024 (KR) ......................... 10-2024-0045856

(51) Int. Cl.
B60W 30/14 (2006.01)
B60W 30/12 (2020.01)
(Continued)

(52) U.S. Cl.
CPC .......... B60W 30/143 (2013.01); B60W 30/12 (2013.01); B60W 30/16 (2013.01); B60W 30/18163 (2013.01); B60W 50/0097 (2013.01); B60W 60/001 (2020.02); B60W 2520/105 (2013.01); B60W 2554/4045 (2020.02); B60W 2554/802 (2020.02)

(58) Field of Classification Search
CPC .... B60W 30/143; B60W 30/12; B60W 30/16; B60W 30/18163; B60W 50/0097; B60W 60/001; B60W 2520/105; B60W 2554/4045; B60W 2554/802; B60W 2554/804; B60W 2720/106; B60W 30/0956; B60W 40/02; B60W 40/10; B60W 2420/403; B60W 2420/408; B60W 2552/53; B60W 2554/80; B60W 30/09; G08G 1/167
See application file for complete search history.

(56) References Cited

U.S. PATENT DOCUMENTS

2023/0012853 A1* 1/2023 Tam ................. B60W 30/0953

FOREIGN PATENT DOCUMENTS

JP 2022-165542 A 11/2022
KR 10-2019-0050217 A 5/2019
(Continued)

OTHER PUBLICATIONS

Liu, Shiwen et al.; "A Driving Intention Prediction Method Based on Hidden Markov Model for Autonomous Driving;" IEEE; Feb. 25, 2019; pp. 1-8.
(Continued)

*Primary Examiner* — Bao Long T Nguyen
(74) *Attorney, Agent, or Firm* — Studebaker Brackett PLLC

(57) ABSTRACT

The disclosure relates to a technology regarding a vehicle control device and method, in a vehicle follow-up control context, comprising receiving surrounding vehicle detection information received from a sensor of a host vehicle, generating cut-in state information for separately predicting a cut-in state using a cut-in probability calculation model based on the surrounding vehicle detection information, and calculating a required acceleration for a follow-up target of the host vehicle selected according to the cut-in state information.

14 Claims, 4 Drawing Sheets

(51) Int. Cl.
*B60W 30/16* (2020.01)
*B60W 30/18* (2012.01)
*B60W 50/00* (2006.01)
*B60W 60/00* (2020.01)

(56) References Cited

FOREIGN PATENT DOCUMENTS

| KR | 10-2019-0066953 | A | 6/2019 |
| KR | 10-2020-0036351 | A | 4/2020 |
| KR | 10-2021-0114683 | A | 9/2021 |
| KR | 10-2023-0133692 | A | 9/2023 |

OTHER PUBLICATIONS

An Office Action mailed by the Korean Ministry of Intellectual Property on Dec. 3, 2025, which corresponds to Korean Patent Application No. 10-2024-0045856 and is related to U.S. Appl. No. 18/800,799.
Notice of Allowance issued in Korean Patent Application No. 10-2024-0045856 dated Apr. 28, 2026.

* cited by examiner

VEHICLE CONTROL DEVICE AND METHOD

CROSS-REFERENCE TO RELATED APPLICATION

This application claims priority from Korean Patent Application No. 10-2024-0045856, filed on Apr. 4, 2024, which is hereby incorporated by reference for all purposes as if fully set forth herein.

BACKGROUND

Field

Embodiments relate to a device and method for controlling a vehicle.

Description of Related Art

Vehicle autonomous driving system may refer to a system that automatically drives the vehicle to a given destination without driver intervention by recognizing and judging the vehicle's status and ambient environment.

A surrounding vehicle which is driving in a lane adjacent to the host vehicle autonomously driving may cut in to the lane of the host vehicle.

If the host vehicle fails to respond to the cut-in surrounding vehicle at an appropriate time, the driver of the host vehicle may be put at risk of collision or end up braking suddenly.

Further, if the autonomous driving system of the host vehicle erroneously or sensitively predicts the cut-in operation of the surrounding vehicle, the driver of the host vehicle may step on the brake unnecessarily even when the surrounding vehicle does not actually cut in.

BRIEF SUMMARY

The present embodiments may provide a vehicle control device for controlling a vehicle in a vehicle follow-up control context.

The present embodiments may also provide a vehicle control method for controlling a vehicle in a vehicle follow-up control context.

In an aspect, the present embodiments may provide a vehicle control device controlling a vehicle in a vehicle follow-up control context, comprising a receiver receiving surrounding vehicle detection information received from a sensor of a host vehicle, a state predictor generating cut-in state information for separately predicting a cut-in state using a cut-in probability calculation model based on the surrounding vehicle detection information, and a controller calculating a required acceleration for a follow-up target of the host vehicle selected according to the cut-in state information.

In another aspect, the present embodiments may provide a vehicle control method controlling a vehicle in a vehicle follow-up control context, comprising a receiving surrounding vehicle detection information received from a sensor of a host vehicle, a generating cut-in state information for separately predicting a cut-in state using a cut-in probability calculation model based on the surrounding vehicle detection information, and a calculating a required acceleration for a follow-up target of the host vehicle selected according to the cut-in state information.

According to the present embodiments, there may be provided a vehicle control device and method for controlling the velocity according to a cut-in state in a vehicle follow-up control context.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
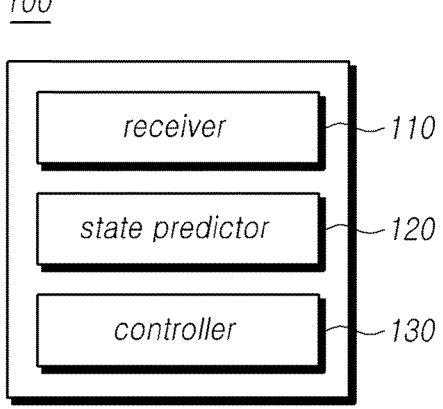
FIG. 1 is a view illustrating a vehicle control device according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

'Training,' 'learning,' and 'model' as used in the detailed description and the claims of the disclosure are terms that encompass models to perform or to be able to perform machine learning or deep learning through computing according to data processing or a procedure through statistics and computation according to a procedure, and it will thus be appreciated by one of ordinary skill in the art that the terms are not intended as denoting mental actions, such as human educational activities, and models to which mental actions are applied.

FIG. 1 is a view illustrating a vehicle control device according to an embodiment.

Referring to FIG. 1, a vehicle control device 100 controlling a vehicle in a vehicle follow-up control context may include a receiver 110 receiving surrounding vehicle detection information received from a sensor of a host vehicle, a state predictor 120 generating cut-in state information for separately predicting a cut-in state using a cut-in probability calculation model based on the surrounding vehicle detection information, and a controller 130 calculating a required acceleration for a follow-up target of the host vehicle selected according to the cut-in state information.

The vehicle control device 100 for controlling the vehicle in the vehicle follow-up control context may include a receiver 110 for receiving surrounding vehicle detection information received from a sensor of the host vehicle.

For example, the vehicle follow-up control context may refer to a context in which the behavior of the host vehicle or the surrounding vehicle is controlled by following the follow-up target when the host vehicle or the surrounding vehicle drives. The behavior of the host vehicle or the surrounding vehicle may include various operations such as vehicle velocity, distance to the front target, and departure/ stop of the vehicle.

For example, the sensor of the host vehicle may obtain data including ground information or lane information about the road by detecting a signal reflected from the ground of the road or lane markings of the road on which the host vehicle and surrounding vehicle drive. For example, the sensor of the host vehicle may include a radar, a light detection and ranging (Lidar), a camera, and a position information sensor (GPS sensor, etc.).

Further, e.g., the sensor of the host vehicle may obtain data according to the behavior of the host vehicle and the surrounding vehicle. The behavior of the host vehicle and the surrounding vehicle may include behavior information according to the transverse control and behavior information according to the longitudinal control. For example, the sensor of the host vehicle may include a steering angle sensor and a yaw rate sensor for obtaining transverse behavior information (transverse position information, transverse velocity information, etc.), and may include a heading angle sensor and a vehicle velocity sensor for obtaining longitudinal behavior information (heading angle, etc.). However, the sensors are not limited to the present embodiments but may include various sensors.

The surrounding vehicle detection information may include transverse position information, transverse velocity information, heading angle information, and lane information about the surrounding vehicle.

For example, the cut-in state of the surrounding vehicle may be predicted separately using surrounding vehicle detection information about the surrounding vehicle present in the most adjacent lane of the host vehicle. For example, the lane of the host vehicle and the lane of the surrounding vehicle may be distinguished using the lane information to determine whether the surrounding vehicle is in the most adjacent lane to the host vehicle, and the cut-in state of the determined surrounding vehicle may be identified. As another example, the transverse position information, the transverse velocity information, and the heading angle may be used as input values when generating cut-in state information about the surrounding vehicle. Further, the surrounding vehicle detection information is not limited to the above-described information but may include various pieces of information.

The vehicle control device 100 may include a state predictor 120 that generates cut-in state information to identify and predict the cut-in state using a cut-in probability calculation model based on surrounding vehicle detection information.

The term 'cut-in' in the disclosure may refer to an operation in which the surrounding vehicle changes the lane and enters the lane of the host vehicle, and the surrounding vehicle enters ahead of the host vehicle. This may be variously configured according to the driving control system of the host vehicle and the surrounding vehicle, and may be changed according to an input signal of the driver. Further, the term 'cut-in' may mean an operation of entering behind the host vehicle as well as ahead of the host vehicle. However, without limitations to the present embodiments, it may be variously configured in advance. Further, for convenience of description, the 'lane of the host vehicle' may be used interchangeably with a 'host lane.'

For example, the cut-in probability calculation model may include a first probability calculation model for calculating a first probability value by estimating a probability that a hidden observed value is emitted by inputting transverse position information and transverse velocity information included in surrounding vehicle detection information as input values, and a second probability calculation model for generating cut-in state information by operating the first probability value and a pre-calculated state transition probability value.

For example, the first probability calculation model may calculate the first probability value by estimating the probability that the hidden observed value is emitted by inputting the transverse position information and the transverse velocity information as input values. A Gaussian mixture model (GMM) may be used as the first probability calculation model. The GMM is a model that models variables that are continuous and multivariate from given data into a plurality of normal distributions, and may correspond to a representative unsupervised learning model. In this case, the data of the plurality of normal distributions that may be output may include not only a real number value but also a probability value. In particular, the GMM may be used to distinguish classes of data, and may calculate the first probability value, which is a probability density value where given data belongs to the GMM. In this case, the first probability value may serve as an emission probability density value in the second probability calculation model. A detailed description of the probability that the hidden observed value is emitted, the emission probability density value, and the statistical model used in the first probability calculation model is made below with reference to FIG. 2.

As another example, the second probability calculation model may generate cut-in state information by operating the first probability value and the state transition probability value calculated by training with data at high speed in advance. A hidden Markov model (HMM) may be used as the second probability calculation model. The HMM is a model that probabilistically models sequential data, and is a model to find the optimal parameter according to the observation state and the probability that the parameter is in the hidden state. Further, a detailed description of the second probability calculation model is made below with reference to FIG. 2.

For example, the cut-in state information may include N preset states divided with respect to a state in which the surrounding vehicle performs cut-in to the lane of the host vehicle, where N may be a natural number of 2 or more.

For example, the N preset states may include a lane keeping state in which the surrounding vehicle keeps in the lane, a cut-in ready state in which the surrounding vehicle prepares to change the lane to the host lane, a cut-in keeping state in which the surrounding vehicle is changing the lane to the host lane, and a cut-in ending state in which the surrounding vehicle finishes changing the lane to the host lane. Further, the N preset states are not limited to the present embodiments, and may be variously preset or variably changed according to lane information, the moving trajectory and velocity of the surrounding vehicle. The cut-in state information is described below with reference to FIG. 3.

For example, the state predictor 120 may further calculate the final probability value and the surrounding vehicle trajectory information generated by operating the first probability value and the pre-calculated state transition probability value using the cut-in probability calculation model including the first probability calculation model and the second probability calculation model. The state predictor 120 may divide the cut-in state into a lane keeping state and a non-lane keeping state using the final probability value. Further, the state predictor 120 may sub-divide the non-lane keeping state into a cut-in ready state, a cut-in keeping state, and the cut-in ending state using the surrounding vehicle trajectory information. In other words, the state predictor 120 may calculate the final probability value and the surrounding vehicle trajectory information using the cut-in probability calculation model to thereby generate cut-in state information for separately predicting the cut-in state. The final probability value and the surrounding vehicle trajectory information are described below in detail with reference to FIG. 2.

The vehicle control device 100 may include a controller 130 for calculating the required acceleration for the follow-up target of the host vehicle selected according to the cut-in state information.

In the disclosure, a follow-up target is selected, and a required acceleration is set for the follow-up target according to the cut-in state information so as to reduce risk and driver's sense of heterogeneity due to a sharp change in required acceleration that occurs while the surrounding vehicle changes the lane to the lane of the host vehicle. However, a detailed description of a method for selecting a follow-up target is made below with reference to FIG. 3.

The required acceleration in the disclosure refers to a required acceleration value calculated by the follow-up control system when the host vehicle is in a follow-up control context. This may be variously set according to the follow-up control system, and may be changed according to the driver's input signal. Hereinafter, the required acceleration in the disclosure may be utilized according to the above-described meaning for convenience of description.

For example, when the cut-in state corresponds to the cut-in ready state, the controller 130 may select the preceding vehicle of the host vehicle as the follow-up target, and calculate any one of the first required acceleration for the follow-up target and the second required acceleration calculated to control the host vehicle to drive at constant speed or to decelerate, as the required acceleration.

For example, when the cut-in state of the surrounding vehicle corresponds to the cut-in ready state, the controller 130 may select the follow-up target as the preceding vehicle of the host vehicle. If the follow-up target is selected as the surrounding vehicle, the vehicle should suddenly slow down. In this case, a sudden change in velocity may give a sense of heterogeneity to the driver of the host vehicle. Accordingly, the controller 130 may select the follow-up target as the preceding vehicle of the host vehicle, calculate the first required acceleration and the second required acceleration, and select one of the first required acceleration and the second required acceleration to relieve inconvenience to the driver.

As another example, when the first required acceleration is smaller than the second required acceleration by comparing the first required acceleration with the second required acceleration, the controller 130 may calculate the first required acceleration as the required acceleration. When the second required acceleration is smaller than the first required acceleration, the controller 130 may calculate the second required acceleration as the required acceleration. In this case, the reason why the smaller value is selected by comparing the first required acceleration and the second required acceleration is to prevent a sense of heterogeneity to the driver due to the sudden change in velocity.

However, the present embodiments are not limited thereto, and the follow-up target may be selected in the cut-in ready state.

Further, when the cut-in state corresponds to the lane keeping state, the controller 130 may calculate the required acceleration by selecting the preceding vehicle of the host vehicle as the follow-up target.

Further, when the cut-in state is the cut-in keeping state or the cut-in ending state, the controller 130 may calculate the required acceleration by selecting the surrounding vehicle determined to be in the cut-in state as the follow-up target.

However, a method for selecting a follow-up target and calculating a required acceleration is not limited to the present embodiments but may be variously calculated.

Hereinafter, various embodiments of the above-described operations of the vehicle control device are described with reference to the drawings. All or some of the embodiments described below may be practiced by each component described above. Further, the embodiments described below may be practiced in any combination.

Figure 2:
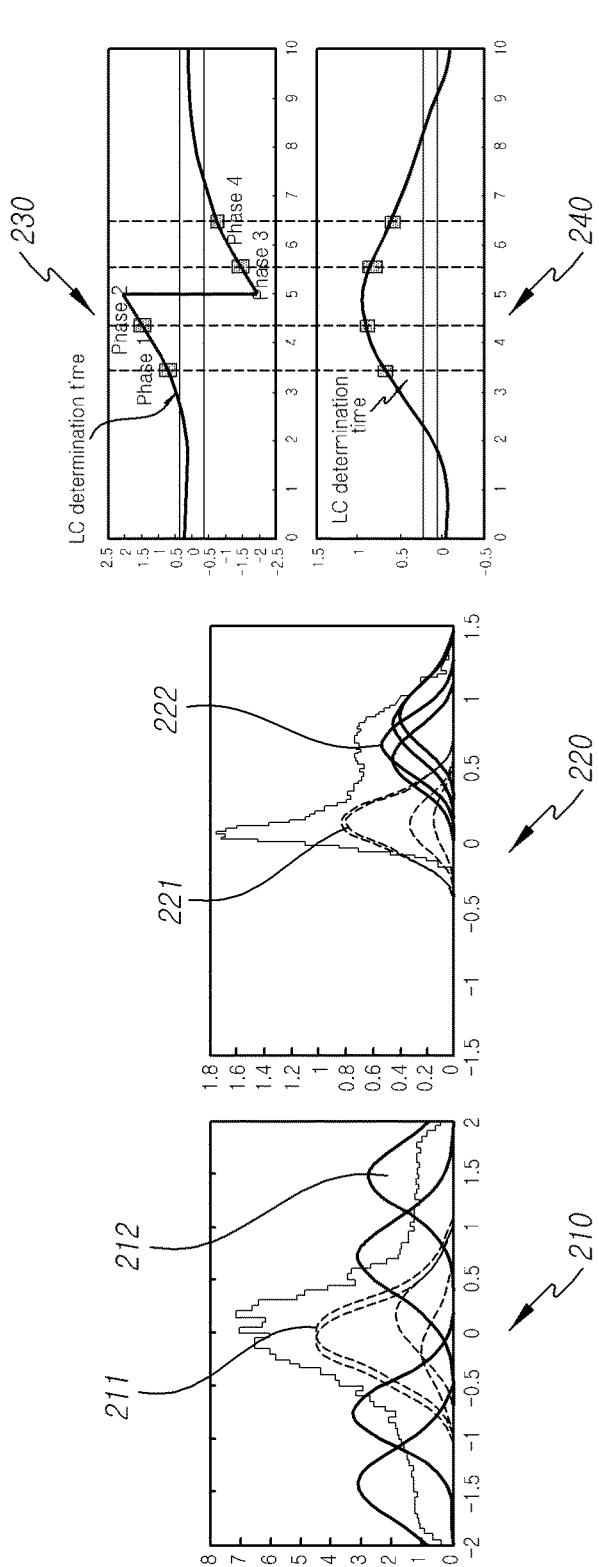
FIG. 2 is a view illustrating a cut-in probability calculation model according to an embodiment.

FIG. 2 is a view illustrating a cut-in probability calculation model according to an embodiment.

Referring to FIG. 2, the cut-in probability calculation model may include a first probability calculation model for calculating a first probability value by estimating a probability that a hidden observed value is emitted by inputting transverse position information and transverse velocity information included in surrounding vehicle detection information as input values, and a second probability calculation model for generating cut-in state information by operating the first probability value and a pre-calculated state transition probability value.

For example, the probability that the hidden observed value is to be emitted may be estimated from the transverse position information and transverse velocity information input in the first probability calculation model utilizing the GMM. The probability that the hidden observed value is to be emitted may be represented in the format of several normal distributions. Further, the first probability value may be calculated using the probability that the hidden observed value is to be emitted. The first probability value may correspond to one of the first emission probability and the second emission probability estimated through the GMM.

The hidden Markov model (HMM) is a statistical Markov model that probabilistically models sequential data. The HMM may find the optimal parameter according to the observation state and may estimate the probability that the parameter is in the hidden state. As described above, the HMM may be utilized as the second probability calculation model.

The HMM may be operated using two elements: the hidden observed value for the hidden state and the observed value that is in an observable state. The direct cause of the observable state is a hidden state that may not be observed. Therefore, the observable state may be observed only when the hidden states are emitted as a result through the HMM.

In this case, the HMM may use the first probability value calculated by estimating the probability that the hidden observed value calculated through the GMM is emitted as the emission probability density value where the hidden observed value is emitted through the HMM. In other words, the first probability value may serve as an emission probability density value in the HMM. Further, the HMM may estimate the probability of being in the hidden state using the emission probability density value as the observed value that is in the observable state.

Hereinafter, the first probability value is a value estimated and calculated through the GMM and may be modeled in the form of a normal distribution diagram. Thus, the following description is made using the normal distribution diagram.

Referring to the first normal distribution 210, the horizontal axis may be transverse position information that is the distance moved left and right with respect to the original position of the surrounding vehicle, and the unit may be meter (m). In this case, the vertical axis may mean the probability value for the transverse position information. Further, the probability that the hidden observed value is emitted may include the first emission probability 211 and the second emission probability 212 estimated from the first probability calculation model. Hereinafter, the first emission probability 211 and the second emission probability 212 are described using the normal distribution diagram.

The distribution of the first emission probability 211 indicated by dashed line is indicated by a plurality of lines, in all of which, the probability values are distributed to be adjacent to 0 of the horizontal axis. Meanwhile, the distribution of the second emission probability 212 indicated by solid line is indicated by a plurality of lines, which are distributed relatively wider with respect to the horizontal axis than the distribution of the first emission probability 211. In other words, the distribution of the first emission probability and the distribution of the second emission probability may be calculated from the transverse position information. Through the first normal distribution 210, it may be determined that the first emission probability 211 has a relatively smaller transverse position than the second emission probability 212. Through the first normal distribution 210, the first emission probability 211 may be estimated as the probability value of the lane keeping state rather than the state in which the transverse position is changed. Further, the second emission probability 212 may be estimated as the probability value of the non-lane keeping state (the cut-in ready state, the cut-in keeping state, and the cut-in ending state) in which the transverse position has changed relatively a lot. In other words, the first probability value may be estimated and calculated as any one of the lane keeping state or the non-lane keeping state according to the probability that the estimated hidden observed value is emitted (the first emission probability or the second emission probability).

Further, the first probability value may further correspond to any one of the third emission probability 221 and the fourth emission probability 222 included in the second normal distribution. For example, further referring to the second normal distribution 220, the horizontal axis may be transverse velocity information indicating a relatively changed velocity with respect to the initial velocity of the surrounding vehicle, and the unit may be m/s. Further, the probability that the estimated hidden observed value is emitted may further include a third emission probability 221 and a fourth emission probability 222. Hereinafter, the third emission probability 221 and the fourth emission probability 222 are described using the normal distribution diagram.

The distribution of the third emission probability 221 indicated by dashed line is indicated by a plurality of lines in total, in all of which, the probability values are distributed to be adjacent to 0 of the horizontal axis. Meanwhile, the distribution of the fourth emission probability 222 indicated by solid line is indicated by a total of four lines, and is distributed at a numerical value relatively farther from the origin of the horizontal axis than the distribution of the third emission probability 221. In other words, the distribution of the third emission probability and the distribution of the fourth emission probability may be calculated from the transverse velocity information. Through the second normal distribution 220, it may be determined that the third emission probability has a relatively lower transverse velocity than the fourth emission probability. Through the second normal distribution 220, the third emission probability may be estimated as the probability value of the lane keeping state rather than the state in which the transverse velocity has changed a lot. Further, the fourth emission probability may be estimated as the probability value of the non-lane keeping state (the cut-in ready state, the cut-in keeping state, and the cut-in ending state) in which the transverse velocity has changed relatively a lot. In other words, the first probability value may be estimated and calculated as any one of the lane keeping state or the non-lane keeping state by further using the probability that the estimated hidden observed value is to be emitted (the third emission probability or the fourth emission probability). Further, the first probability value may not be a final probability value, but may be used as an input value of the second probability calculation model.

Additionally, the state predictor 120 may calculate the surrounding vehicle trajectory information using the cut-in probability calculation model to sub-divide the cut-in state.

For example, as described above, it may be divided into the lane keeping state and the non-lane keeping state through the first probability value. Further, the non-lane keeping state may be calculated using the surrounding vehicle trajectory information. In this case, the surrounding vehicle trajectory information may be calculated using the first probability value. The first probability value is a value to be calculated by generating a normal distribution diagram by inputting the transverse velocity information and the transverse position information as input values. Accordingly, the surrounding vehicle trajectory information may be calculated by employing a normal distribution diagram format, placing the transverse velocity information or the transverse position information on the vertical axis, placing the time on the horizontal axis, and utilizing the first probability value as the corresponding actual data. However, the present embodiments are not limited thereto, and surrounding vehicle trajectory information may be calculated in various ways.

For example, the surrounding vehicle trajectory information may include first trajectory information 230 and second trajectory information 240. As described above, the horizontal axis of the first trajectory information 230 may be set to time, and the vertical axis may be set to transverse position information. The horizontal axis of the second trajectory information 240 may be set to time, and the vertical axis may be set to the transverse velocity information about the surrounding vehicle. According to the first trajectory information 230 and the second trajectory information, in Phase 1, the transverse position information about the surrounding vehicle is about 0.5 m, and the transverse velocity information corresponds to about 0.5 m/s. In Phase 2, the transverse position information about the surrounding vehicle is about 1.5 m, and the transverse velocity information corresponds to about 1 m/s. Therefore, since Phase 1 corresponds to a state in which both the transverse position information and the transverse velocity information are smaller than Phase 2, Phase 1 may be estimated as the cut-in ready state.

Further, the transverse position information in Phase 3 is about −2.0 m and the transverse velocity information corresponds to about 1 m/s. The transverse position information in Phase 4 is about −1.0 m and the transverse velocity information corresponds to about 0.5 m/s. Phase 4 has relatively smaller transverse velocity information than Phase 2 or Phase 3, and also has an absolute value of transverse position information smaller than that of Phase 2 or Phase 3. Therefore, Phase 4 may be estimated as the cut-in ending state. Further, Phase 2 and Phase 3 may be estimated as the cut-in keeping state.

However, since the present embodiments are merely an example, the present embodiments are not limited thereto, and the non-lane keeping state may be determined and estimated by various methods.

Meanwhile, the second probability calculation model may generate the cut-in state information by operating the first probability value and the pre-calculated state transition probability value. The above-described HMM is a model considered as constituted of two elements: the hidden observed value for the hidden state and the observed value that is in an observable state. The second probability calculation model may generate the cut-in state information by calculating the final probability value by operating the first probability value and the state transition probability value related to the observed value in the observable state.

Further, the state transition probability value related to the observed value in the observable state may mean the value of the probability that the hidden state is to be selected at the current time when the hidden state is given at the immediately prior time. Accordingly, the state transition probability value may be pre-calculated in the second probability calculation model and be operated with the first probability value, and may thereby be calculated as the final probability value.

For example, the final probability value may be predicted by being divided into two states, and the surrounding vehicle trajectory information may be predicted by being divided into three states. The final probability value may include the probability value in the lane keeping state and the probability value in the non-lane keeping state. In this case, if the probability value of the lane keeping state is larger than or equal to the probability value of the non-lane keeping state, the surrounding vehicle may be predicted as being in the lane keeping state. However, if the probability value of the lane keeping state is smaller than the probability value of the non-lane keeping state, the surrounding vehicle may be predicted as being in the non-lane keeping state, and thus it is necessary to additionally determine the surrounding vehicle trajectory information. In this case, if corresponding to Phase 1 through the surrounding vehicle trajectory information, the cut-in probability calculation model may predict it as being in the cut-in ready state. If the surrounding vehicle trajectory information is determined as Phase 2 and Phase 3, it may be predicted as being in the cut-in keeping state. Further, if the surrounding vehicle trajectory information is determined as Phase 4, it may be predicted as being in the cut-in ending state.

In other words, as described above, the state predictor 120 may calculate the final probability value and the surrounding vehicle trajectory information using the cut-in probability calculation model to thereby generate cut-in state information for separately predicting the cut-in state. However, the cut-in state information is not limited to the above-described embodiment but may include various states.

Figure 3:
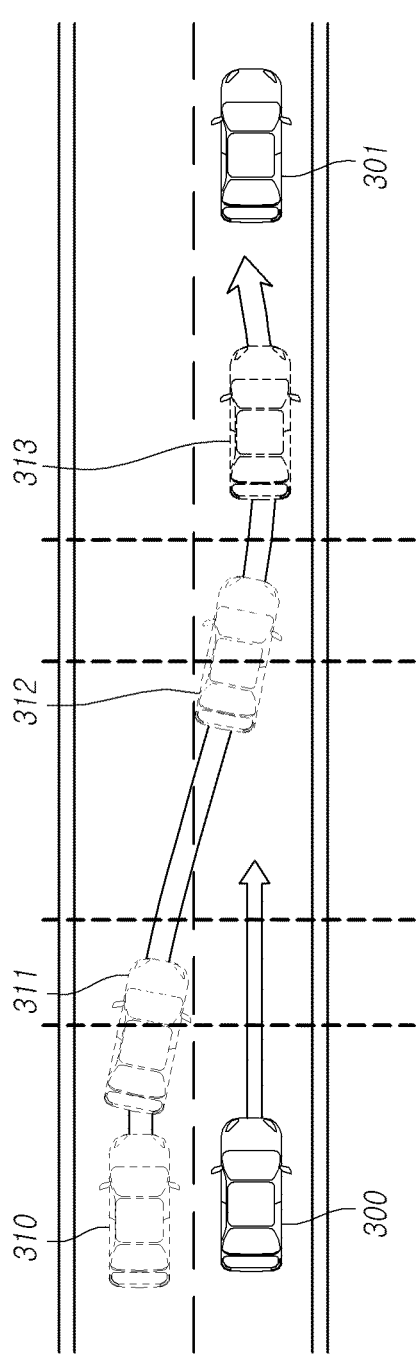
FIG. 3 is a view illustrating a method for selecting a follow-up target and cut-in state information according to an embodiment.

FIG. 3 is a view illustrating a method for selecting a follow-up target and cut-in state information according to an embodiment.

A state in which cut-in state information generated through the above-described state predictor is disposed on an actual road is described in detail with reference to FIG. 3. Referring to FIG. 3, the cut-in state information may include preset states divided with respect to the state in which the surrounding vehicle 310, 311, 312, or 313 performs cut-in to the lane of the host vehicle 300.

Hereinafter, for convenience of description, a state in cut-in proceeds based on a state in which the surrounding vehicle 310 drives in the very next lane (left lane) to the lane of the host vehicle 300 is sequentially described.

For example, the preset states may include a lane keeping state, a cut-in ready state, a cut-in keeping state, and a cut-in ending state.

For example, the lane keeping state may mean a state in which the surrounding vehicle 310 maintains the left lane of the host vehicle 300.

As another example, the cut-in ready state may mean a state in which the surrounding vehicle 311 turns to the lane of the host vehicle 300 from the left lane of the host vehicle 300, but does not cross the lane. In other words, the cut-in ready state may mean a state in which the surrounding vehicle 311 prepares to change the lane to the host lane. Further, the cut-in ready state may include a cut-in state generated due to misjudgment from, e.g., a malfunction of the sensor of the host vehicle.

As another example, the cut-in keeping state may mean a state in which the surrounding vehicle 312 turns from the left lane of the host vehicle 300 to the lane of the host vehicle 300 and, at least, a front portion of the surrounding vehicle 312 crosses the lane. In other words, the cut-in ready state may mean a state in which the surrounding vehicle 312 is changing the lane to the host lane.

As another example, the cut-in ending state may mean a state in which the surrounding vehicle 313 finishes lane change to the lane of the host vehicle 300, i.e., the host lane.

In this case, since the surrounding vehicle 313 and the host vehicle 300 may drive in the same lane, the host vehicle 300 in the vehicle follow-up context may be required to select the surrounding vehicle 313, not the preceding vehicle, as the follow-up target.

Referring to FIG. 3, the follow-up target of the host vehicle 300 may be selected according to the cut-in state information. The cut-in state information has been described above, and a method for selecting the follow-up target is described.

For example, when the cut-in state of the surrounding vehicle 311 corresponds to the cut-in ready state, the preceding vehicle of the host vehicle may be selected as the follow-up target, and any one of the first required acceleration for the follow-up target and the second required acceleration calculated to control the host vehicle to drive at constant speed or to decelerate may be calculated as the required acceleration.

For example, when the cut-in state of the surrounding vehicle corresponds to the cut-in ready state, the follow-up target may be selected as the preceding vehicle of the host vehicle. If the follow-up target is selected as the surrounding vehicle 311, the vehicle should suddenly slow down. In this case, a sudden change in velocity may give a sense of heterogeneity to the driver of the host vehicle 300. Accordingly, the controller may select the follow-up target as the preceding vehicle 301 of the host vehicle 300, calculate the first required acceleration and the second required acceleration, and select one of the first required acceleration and the second required acceleration to relieve inconvenience to the driver.

For example, when the cut-in state of the surrounding vehicle 310 corresponds to the lane keeping state, the preceding vehicle 301 of the host vehicle 300 may be selected as the follow-up target, and the required acceleration may be calculated. in this case, the host vehicle 300 may select the preceding vehicle 301 as the follow-up target without limitations to the driving state of the surrounding vehicle 310 in the follow-up control context.

For example, when the cut-in state of the surrounding vehicle 312 or 313 is the cut-in keeping state or the cut-in ending state, the required acceleration may be calculated by selecting the surrounding vehicle 312 or 313 determined to be in the cut-in state as the follow-up target. In this case, as the surrounding vehicle 312 or 313 for which the cut-in state is determined, rather than the preceding vehicle 301, is selected as the follow-up target, the risk of collision with the surrounding vehicle 312 or 313 may be prevented. Further, the velocity of the host vehicle may be stably controlled to provide a stable ride to the driver and passengers.

Figure 4:
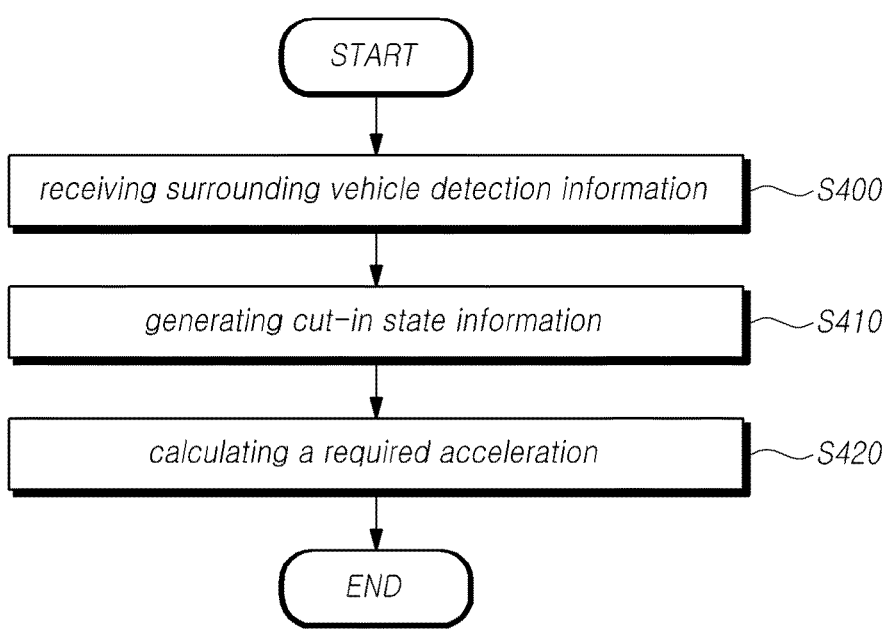
FIG. 4 is a flowchart illustrating a vehicle control method according to an embodiment.

FIG. 4 is a flowchart illustrating a vehicle control method according to an embodiment.

Referring to FIG. 4, a vehicle control method controlling a vehicle in a vehicle follow-up control context may include a receiving surrounding vehicle detection information received from a sensor of a host vehicle S400, a generating cut-in state information for separately predicting a cut-in state using a cut-in probability calculation model based on the surrounding vehicle detection information S410, and a calculating a required acceleration for a follow-up target of the host vehicle selected according to the cut-in state information S420.

The vehicle control method may include a receiving surrounding vehicle detection information received from a sensor of the host vehicle in a vehicle follow-up control context (S400).

For example, the vehicle follow-up control context may refer to a context in which the behavior of the host vehicle or the surrounding vehicle is controlled by following the follow-up target when the host vehicle or the surrounding vehicle drives. The behavior of the host vehicle or the surrounding vehicle may include various operations such as vehicle velocity, distance to the front target, and departure/ stop of the vehicle.

For example, the sensor of the host vehicle may obtain data including ground information or lane information about the road by detecting a signal reflected from the ground of the road or lane markings of the road on which the host vehicle and surrounding vehicle drive. For example, the sensor of the host vehicle may include a radar, a light detection and ranging (Lidar), a camera, and a position information sensor (GPS sensor, etc.).

Further, e.g., the sensor of the host vehicle may obtain data according to the behavior of the host vehicle and the surrounding vehicle. The behavior of the host vehicle and the surrounding vehicle may include behavior information according to the transverse control and behavior information according to the longitudinal control. For example, the sensor of the host vehicle may include a steering angle sensor and a yaw rate sensor for obtaining transverse behavior information (transverse position information, transverse velocity information, etc.), and may include a heading angle sensor and a vehicle velocity sensor for obtaining longitudinal behavior information (heading angle, etc.). However, the sensors are not limited to the present embodiments but may include various sensors.

The surrounding vehicle detection information may include transverse position information, transverse velocity information, heading angle information, and lane information about the surrounding vehicle.

For example, the cut-in state of the surrounding vehicle may be predicted separately using surrounding vehicle detection information about the surrounding vehicle present in the most adjacent lane of the host vehicle. For example, the lane of the host vehicle and the lane of the surrounding vehicle may be distinguished using the lane information to determine whether the surrounding vehicle is in the most adjacent lane to the host vehicle, and the cut-in state of the determined surrounding vehicle may be identified. As another example, the transverse position information, the transverse velocity information, and the heading angle may be used as input values when generating cut-in state information about the surrounding vehicle. Further, the surrounding vehicle detection information is not limited to the above-described information but may include various pieces of information.

The vehicle control method may include a generating cut-in state information to identify and predict the cut-in state using a cut-in probability calculation model based on surrounding vehicle detection information (S410).

The term 'cut-in' in the disclosure may refer to an operation in which the surrounding vehicle changes the lane and enters the lane of the host vehicle, and the surrounding vehicle enters ahead of the host vehicle. This may be variously configured according to the driving control system of the host vehicle and the surrounding vehicle, and may be changed according to an input signal of the driver. Further, the term 'cut-in' may mean an operation of entering behind the host vehicle as well as ahead of the host vehicle. However, without limitations to the present embodiments, it may be variously configured in advance. Further, for convenience of description, the 'lane of the host vehicle' may be used interchangeably with a 'host lane.'

For example, the cut-in probability calculation model may include a first probability calculation model for calculating a first probability value by estimating a probability that a hidden observed value is emitted by inputting transverse position information and transverse velocity information included in surrounding vehicle detection information as input values, and a second probability calculation model for generating cut-in state information by operating the first probability value and a pre-calculated state transition probability value.

For example, the first probability calculation model may calculate the first probability value by estimating the probability that the hidden observed value is emitted by inputting the transverse position information and the transverse velocity information as input values. A Gaussian mixture model (GMM) may be used as the first probability calculation model. The GMM is a model that models variables that are continuous and multivariate from given data into a plurality of normal distributions, and may correspond to a representative unsupervised learning model. In this case, the data of the plurality of normal distributions that may be output may include not only a real number value but also a probability value. In particular, the GMM may be used to distinguish classes of data, and may calculate the first probability value, which is a probability density value where given data belongs to the GMM. In this case, the first probability value may serve as an emission probability density value in the second probability calculation model.

As another example, the second probability calculation model may generate cut-in state information by operating the first probability value and the state transition probability value calculated by training with data at high speed in advance. A hidden Markov model (HMM) may be used as the second probability calculation model. The HMM is a model that probabilistically models sequential data, and is a model to find the optimal parameter according to the observation state and the probability that the parameter is in the hidden state. For example, the cut-in state information may include N preset states divided with respect to a state in which the surrounding vehicle performs cut-in to the lane of the host vehicle, where N may be a natural number of 2 or more.

For example, the N preset states may include a lane keeping state in which the surrounding vehicle keeps in the lane, a cut-in ready state in which the surrounding vehicle prepares to change the lane to the host lane, a cut-in keeping state in which the surrounding vehicle is changing the lane to the host lane, and a cut-in ending state in which the surrounding vehicle finishes changing the lane to the host lane. Further, the N preset states are not limited to the present embodiments, and may be variously preset or variably changed according to lane information, the moving trajectory and velocity of the surrounding vehicle.

For example, the generating cut-in state information S410 may further calculate the final probability value and the surrounding vehicle trajectory information generated by operating the first probability value and the pre-calculated state transition probability value using the cut-in probability calculation model including the first probability calculation model and the second probability calculation model. The generating cut-in state information S410 may divide the cut-in state into a lane keeping state and a non-lane keeping state using the final probability value. Further, the generating cut-in state information S410 may sub-divide the non-lane keeping state into a cut-in ready state, a cut-in keeping state, and the cut-in ending state using the surrounding vehicle trajectory information. In other words, the generating cut-in state information S410 may calculate the final probability value and the surrounding vehicle trajectory information using the cut-in probability calculation model to thereby generate cut-in state information for separately predicting the cut-in state.

The vehicle control method may include a calculating the required acceleration for the follow-up target of the host vehicle selected according to the cut-in state information (S420).

In the disclosure, a follow-up target is selected, and a required acceleration is set for the follow-up target according to the cut-in state information so as to reduce risk and driver's sense of heterogeneity due to a sharp change in required acceleration that occurs while the surrounding vehicle changes the lane to the lane of the host vehicle.

The required acceleration in the disclosure refers to a required acceleration value calculated by the follow-up control system when the host vehicle is in a follow-up control context. This may be variously set according to the follow-up control system, and may be changed according to the driver's input signal. Hereinafter, the required acceleration in the disclosure may be utilized according to the above-described meaning for convenience of description.

For example, when the cut-in state corresponds to the cut-in ready state, the calculating the required acceleration S420 may select the preceding vehicle of the host vehicle as the follow-up target, and calculate any one of the first required acceleration for the follow-up target and the second required acceleration calculated to control the host vehicle to drive at constant speed or to decelerate, as the required acceleration.

For example, when the cut-in state of the surrounding vehicle corresponds to the cut-in ready state, the calculating the required acceleration S420 may select the follow-up target as the preceding vehicle of the host vehicle. If the follow-up target is selected as the surrounding vehicle, the vehicle should suddenly slow down. In this case, a sudden change in velocity may give a sense of heterogeneity to the driver of the host vehicle. Accordingly, the controller 130 may select the follow-up target as the preceding vehicle of the host vehicle, calculate the first required acceleration and the second required acceleration, and select one of the first required acceleration and the second required acceleration to relieve inconvenience to the driver.

As another example, when the first required acceleration is smaller than the second required acceleration by comparing the first required acceleration with the second required acceleration, the calculating the required acceleration may calculate the first required acceleration as the required acceleration. When the second required acceleration is smaller than the first required acceleration, the calculating the required acceleration may calculate the second required acceleration as the required acceleration. In this case, the reason why the smaller value is selected by comparing the first required acceleration and the second required acceleration is to prevent a sense of heterogeneity to the driver due to the sudden change in velocity.

However, the present embodiments are not limited thereto, and the follow-up target may be selected in the cut-in ready state.

Further, when the cut-in state corresponds to the lane keeping state, the calculating the required acceleration S420 may calculate the required acceleration by selecting the preceding vehicle of the host vehicle as the follow-up target.

Further, when the cut-in state is the cut-in keeping state or the cut-in ending state, the calculating the required acceleration S420 may calculate the required acceleration by selecting the surrounding vehicle determined to be in the cut-in state as the follow-up target. However, a method for selecting a follow-up target and calculating a required acceleration is not limited to the present embodiments but may be variously calculated.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A vehicle control device controlling a vehicle in a vehicle follow-up control context, comprising:
  a processor configured to:
  receive surrounding vehicle detection information received from a sensor of a host vehicle;
  generate cut-in state information for separately predicting a cut-in state using a cut-in probability calculation model based on the surrounding vehicle detection information;
  calculate a required acceleration for a follow-up target of the host vehicle selected according to the cut-in state information; and
  control the host vehicle to drive according to the required acceleration,
  wherein the cut-in probability calculation model includes a first probability calculation model calculating a first probability value by estimating a probability that a hidden observed value is to be emitted by inputting transverse position information and transverse velocity information included in the surrounding vehicle detection information as an input value, and a second probability calculation model generating cut-in state information by operating the first probability value and a pre-calculated state transition probability value.

2. The vehicle control device of claim 1, wherein the surrounding vehicle detection information includes transverse position information, transverse velocity information, heading angle information, and lane information about a surrounding vehicle.

3. The vehicle control device of claim 1, wherein the cut-in state information includes N preset states divided with respect to a state in which a surrounding vehicle performs cut-in to a lane of the host vehicle, wherein N is a natural number of 2 or more.

4. The vehicle control device of claim 3, wherein the N preset states include a lane keeping state in which the surrounding vehicle maintains a lane, a cut-in ready state in which the surrounding vehicle prepares to change a lane to a host lane, a cut-in keeping state in which the surrounding vehicle is changing the lane to the host lane, and a cut-in ending state in which the surrounding vehicle finishes the lane change to the host lane.

5. The vehicle control device of claim 4, wherein when the cut-in state corresponds to the cut-in ready state, the processor selects a preceding vehicle of the host vehicle as a follow-up target, and calculates any one of a first required acceleration for the follow-up target and a second required acceleration calculated to control the host vehicle to drive at a constant velocity or to decelerate as the required acceleration.

6. The vehicle control device of claim 4, wherein when the cut-in state corresponds to the lane keeping state, the processor calculates the required acceleration by selecting a preceding vehicle of the host vehicle as the follow-up target.

7. The vehicle control device of claim 4, wherein when the cut-in state is the cut-in keeping state or the cut-in ending state, the processor calculates the required acceleration by selecting the surrounding vehicle for which the cut-in state is determined as the follow-up target.

8. A vehicle control method controlling a vehicle in a vehicle follow-up control context, the vehicle control method comprising:
  receiving surrounding vehicle detection information received from a sensor of a host vehicle;
  generating cut-in state information for separately predicting a cut-in state using a cut-in probability calculation model based on the surrounding vehicle detection information;
  calculating a required acceleration for a follow-up target of the host vehicle selected according to the cut-in state information; and
  controlling the host vehicle to drive according to the required acceleration,
  wherein the cut-in probability calculation model includes a first probability calculation model calculating a first probability value by estimating a probability that a hidden observed value is to be emitted by inputting transverse position information and transverse velocity information included in the surrounding vehicle detection information as an input value, and a second probability calculation model generating cut-in state information by operating the first probability value and a pre-calculated state transition probability value.

9. The vehicle control method of claim 8, wherein the surrounding vehicle detection information includes transverse position information, transverse velocity information, heading angle information, and lane information about a surrounding vehicle.

10. The vehicle control method of claim 8, wherein the cut-in state information includes N preset states divided with respect to a state in which a surrounding vehicle performs cut-in to a lane of the host vehicle, wherein N is a natural number of 2 or more.

11. The vehicle control method of claim 10, wherein the N preset states include a lane keeping state in which the surrounding vehicle maintains a lane, a cut-in ready state in which the surrounding vehicle prepares to change a lane to a host lane, a cut-in keeping state in which the surrounding vehicle is changing the lane to the host lane, and a cut-in ending state in which the surrounding vehicle finishes the lane change to the host lane.

12. The vehicle control method of claim 11, wherein when the cut-in state corresponds to the cut-in ready state, the calculating the required acceleration selects a preceding vehicle of the host vehicle as a follow-up target, and calculates any one of a first required acceleration for the follow-up target and a second required acceleration calculated to control the host vehicle to drive at a constant velocity or to decelerate as the required acceleration.

13. The vehicle control method of claim 11, wherein when the cut-in state corresponds to the lane keeping state, the calculating the required acceleration calculates the required acceleration by selecting a preceding vehicle of the host vehicle as the follow-up target.

14. The vehicle control method of claim 11, wherein when the cut-in state is the cut-in keeping state or the cut-in ending state, the calculating the required acceleration calculates the required acceleration by selecting the surrounding vehicle for which the cut-in state is determined as the follow-up target.

\* \* \* \* \*